Aug. 21, 1956
R. H. WILMER ET AL
2,759,773
DRAWER SUSPENSION
Filed Oct. 16, 1953
4 Sheets-Sheet 1
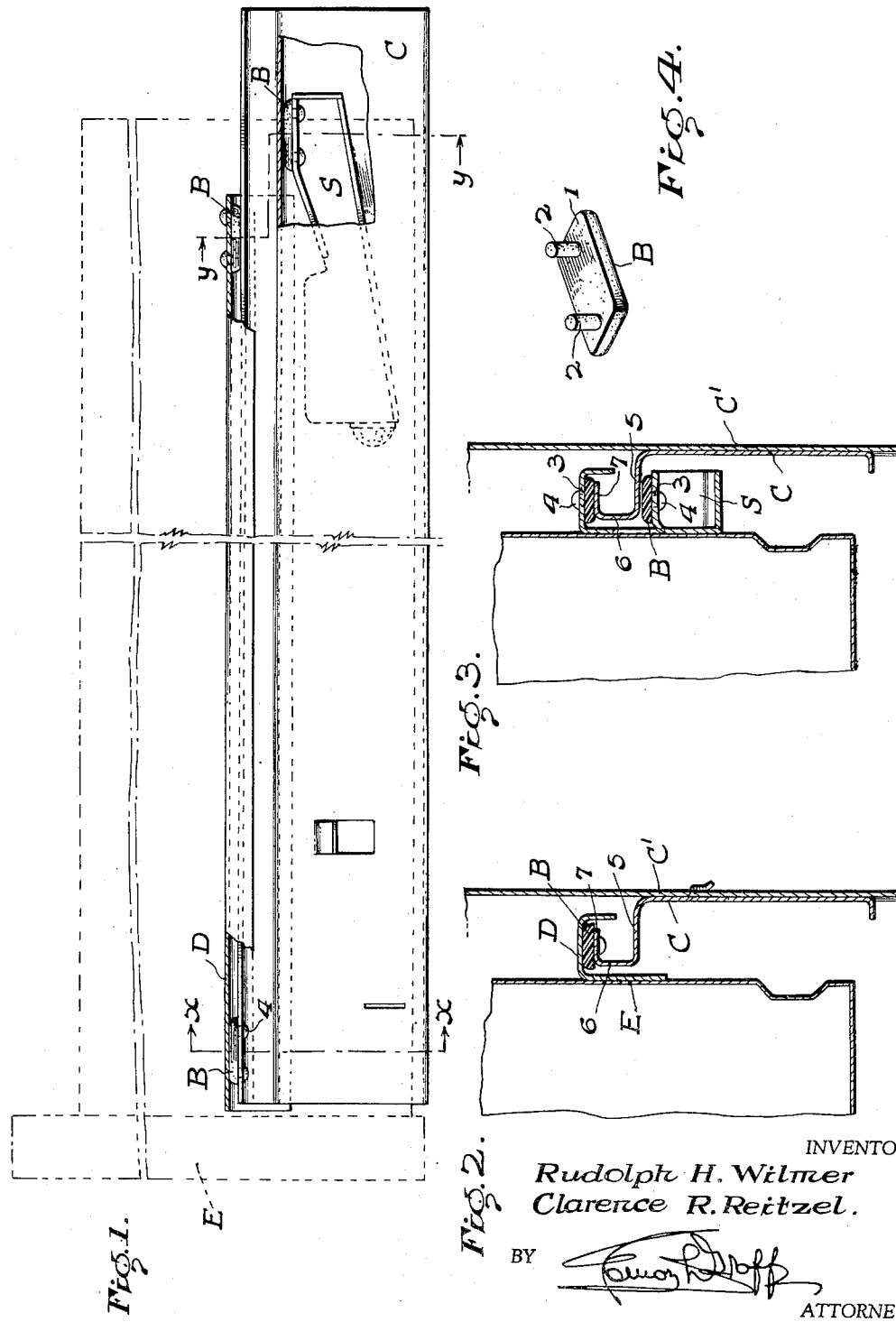
INVENTORS
Rudolph H. Wilmer
Clarence R. Reitzel.
BY
ATTORNEY

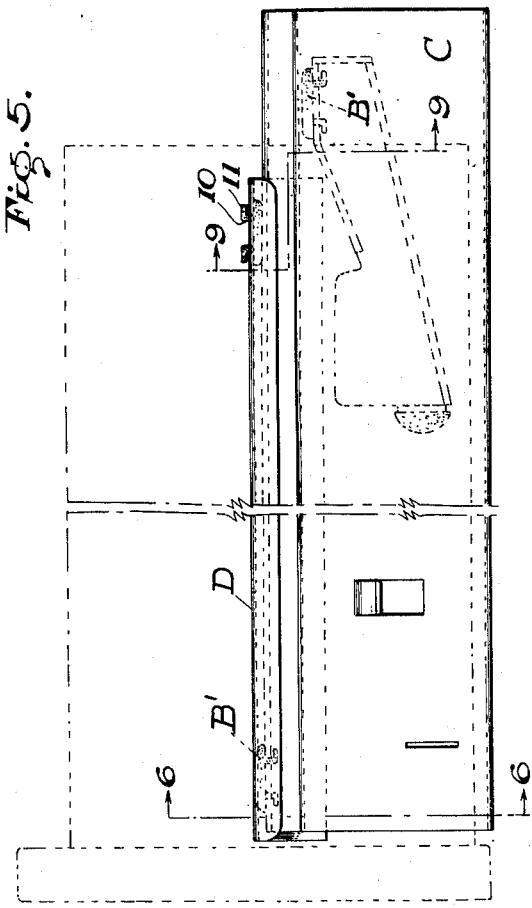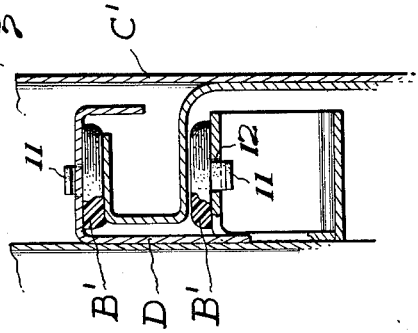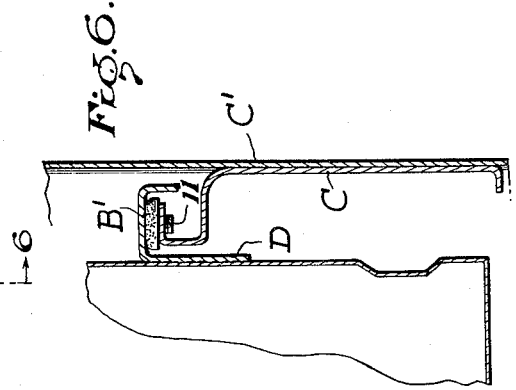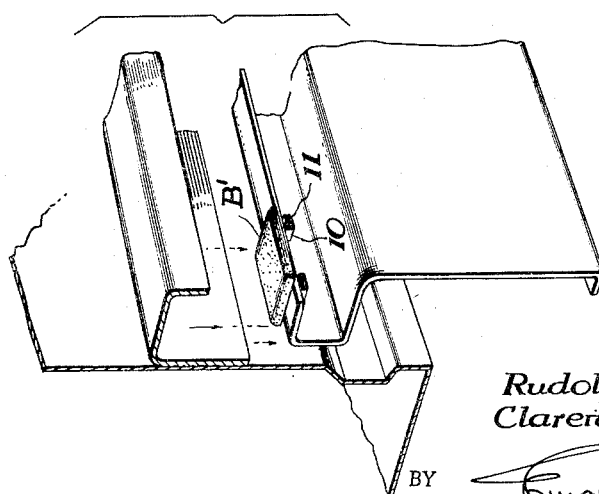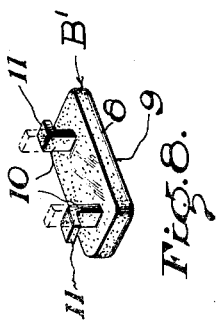

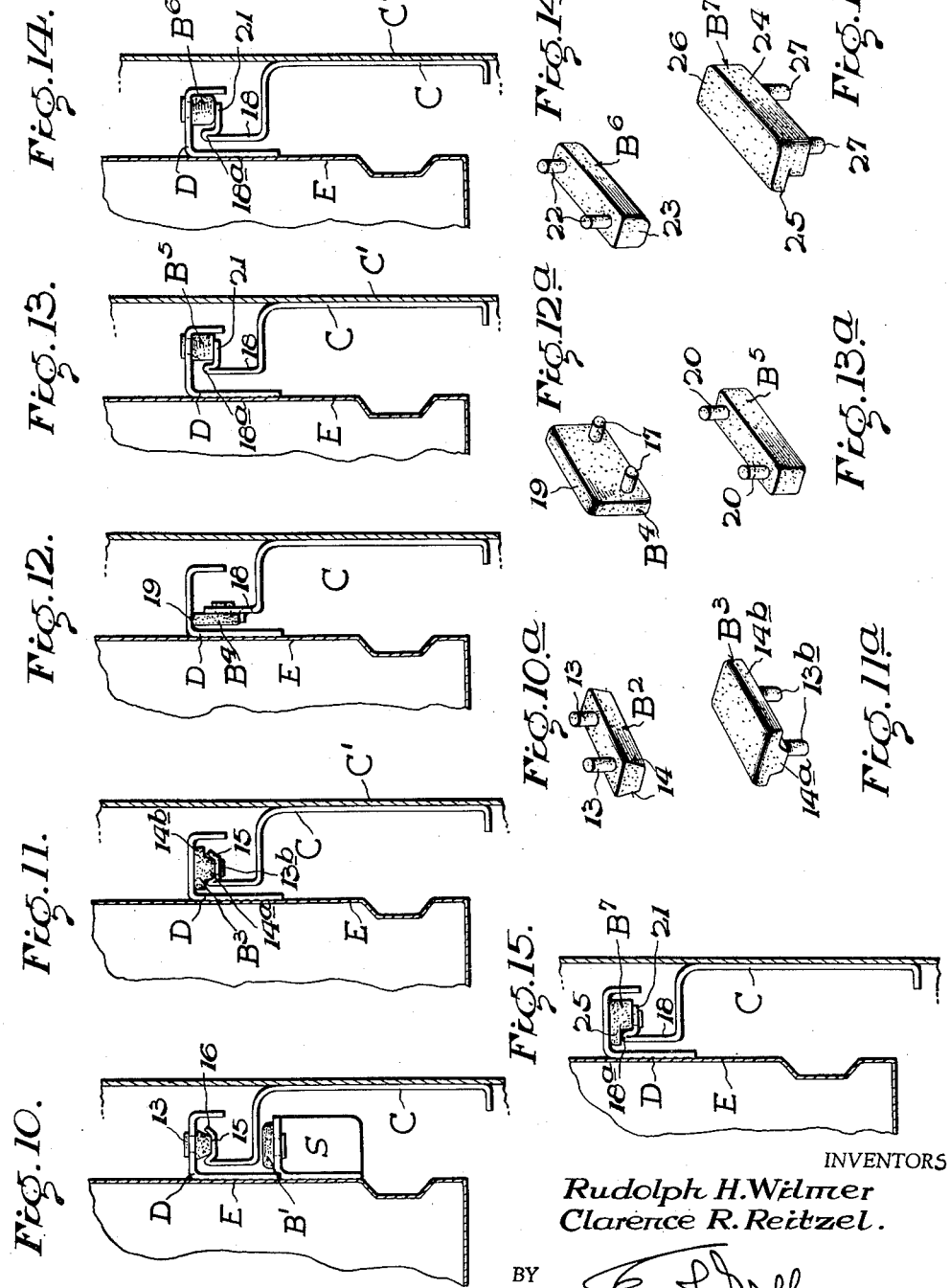

Fig.16.
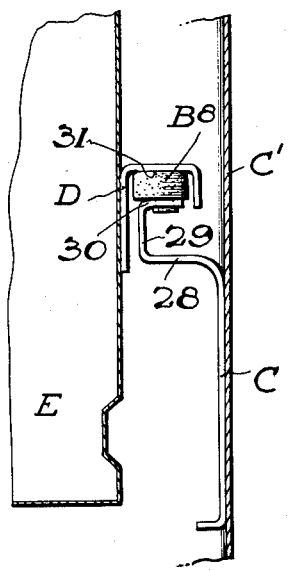
Fig.17.
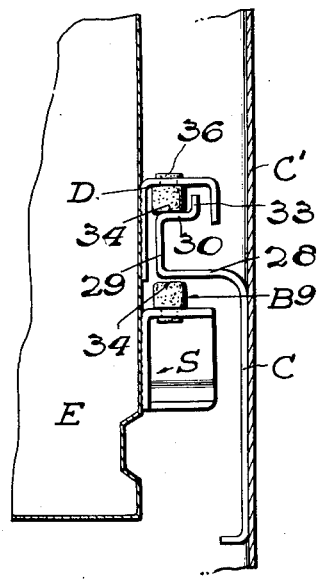
Fig.16.a
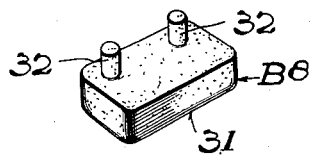
Fig.17.a
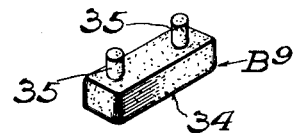
INVENTORS
Rudolph H. Wilmer
Clarence R. Reitzel.
BY
ATTORNEY

United States Patent Office 2,759,773
Patented Aug. 21, 1956

2,759,773

DRAWER SUSPENSION

Rudolph H. Wilmer and Clarence R. Reitzel, Youngstown, Ohio, assignors to The General Fireproofing Company, Youngstown, Ohio, a corporation of Ohio Application October 16, 1953, Serial No. 386,565

5 Claims. (Cl. 308—3.6)

This invention relates to drawer suspensions for filing cabinets.

One of the objects of the invention is to provide antifriction means secured on the drawer channel and the case channel in the form of a bearing element of lubricous material such, for example, as nylon, said element being formed in a manner to facilitate ready mounting on the appropriate part of a related channel and including attachment means for resisting relative angular movement after it has once been secured in place.

Another object of the invention is to provide a bearing member in the nature of an elongated block having a plurality of longitudinally aligned anchoring elements for cooperating with related openings in the part to which it is attached to resist angular movement. In that connection, the said anchoring elements may be of the type whose ends may be upset after the fashion of a rivet for securing the member against lateral separation from the part to which it is attached, or said members may be of the type to snap into place under pressure to become automatically engaged with a related channel.

A further object of the invention is to provide an elongated bearing member in the nature of a sleeve having an offset portion for cooperation with a related opening in the part to which it is attached.

A still further object of the invention is to provide a case channel having a cross-sectional configuration or profile which lends itself to the provision of a surface for supporting the bearing members and also bearing on a related part of the drawer channel.

With the above and other objects in view, which will more readily appear as the nature of the invention is better understood, the same consists in the novel construction, combination and arrangement of parts hereinafter more fully illustrated and claimed.

In the drawings:

Figure 1 is a side elevation of a drawer suspension showing the drawer and case channels as they would appear when the drawer, shown in dotted lines, is closed.

Figure 2 is a vertical sectional view taken on the line x—x of Figure 1.

Figure 3 is a vertical sectional view taken on the line y—y of Figure 1.

Figure 4 is a perspective view of the bearing members shown in Figures 1 to 3.

Figure 5 is a side elevation of a drawer suspension illustrating the drawer and case channels and a modified form of bearing member.

Figure 6 is a vertical sectional view taken on the line 6—6 of Figure 5.

Figure 7 is a pulled-apart detail perspective view of the arrangement shown in Figure 6.

Figure 8 is a perspective view of the modified snap-on form of bearing member shown in Figures 5, 6 and 7.

Figure 9 is an enlarged detail sectional view taken on line 9—9 of Figure 5.

Figures 10 and 11 are companion vertical sectional views taken at a position corresponding to lines x—x and y—y of Figure 1 and illustrating modified forms of bearing members.

Figure 10a is a perspective view of the bearing member shown on the drawer channel of Figure 10.

Figure 11a is a perspective view of the bearing member shown in Figure 11.

Figures 12 and 13 are also companion views illustrating the drawer and case channels having modified forms of bearing members.

Figure 12a is a perspective view of the type of bearing member shown in Figure 12.

Figure 13a is a perspective view of the type of bearing member shown in Figure 13.

Figures 14 and 15 are companion views of a drawer and case channel taken on a line of section corresponding to x—x and y—y of Figure 1.

Fig. 14a is a perspective view of the type of bearing member shown in Fig. 14.

Fig. 15a is a perspective view of the type of bearing member shown in Fig. 15.

Figures 16 and 17 are companion vertical sections showing a further modification of the invention.

Figures 16a and 17a are respectively perspective views of the bearing members used in Figures 16 and 17.

Similar reference characters designate corresponding parts throughout the several figures of the drawings.

A drawer suspension ordinarily comprises what is known in the art as a case channel and a drawer channel, the case channel, as the name implies, being attached to the casing or cabinet, and the drawer channel being attached to the drawer. It will, therefore, be understood that where sectional views are shown without accompanying side elevations, the case and drawer channels are of substantially the length indicated in Figure 1.

Referring more specifically to Figure 1, the case channel is designated generally as C, and the drawer channel is designated generally as D, while the drawer, shown in dotted lines, which carries the drawer channel, is designated generally as E. As will be seen from Figure 2, the case channel C is approximately attached to the case or cabinet C' while the drawer channel D, having an inverted guide portion, is appropriately secured to the drawer E. The companion view, Figure 3, also shows the drawer E as having a stirrup S.

In all forms of the invention, the drawer channel D includes an inverted guide portion whose horizontal wall may carry a bearing member or, on the other hand, serve as a track or bearing surface for one of said members.

Variations will appear in the form of the case channel as will hereinafter appear.

The bearing members B, shown in perspective in Figure 4, may be mounted on the surfaces shown in Figures 1, 2 and 3.

In Figure 4, the bearing member B consists of a relatively elongated body 1 having anchoring elements or projections 2 offset from the inner side thereof, in spaced longitudinal alignment, and which are intended to be inserted in related co-planar openings 3 of the part on which they are mounted. As shown, the ends of the anchoring elements 2 may be riveted or headed as shown at 4 in Figures 1–3. It will also be seen that the anchoring elements 2—2 when secured on a related part will hold the body 1 against axial as well as relative angular movement so that the original position will be consistently maintained during the operation of the drawer as the outer face of the bearing member slides relative to the contacting surface of the mating part of the suspension.

In Figures 1 to 4, the case channel C has one of its horizontal flanges 5, namely the lower flange, continued upwardly as indicated at 6 and then horizontally as indicated at 7, thereby to provide lower and upper flanges or tracks. The underside of the flange 5 provides a surface against which the bearing member B on the stirrup may ride while the flange 7 supports one of the bearing members B which, in turn, bears against the inner side of the inverted guide portion of the drawer channel D.

Figures 5 to 9, inclusive, of the drawings illustrate a bearing member B' which is intended to be of the snap-on type as distinguished from a type which requires a riveting or pressing operation. The bearing member B' comprises an elongated, substantially rectangular body 8 with a bearing face 9 and longitudinally spaced apart, yieldable anchoring elements 10 whose ends 11 are angularly disposed to enter an opening or slot 12 in the member of the suspension to which they are attached. In these figures, the case channel has the same cross-sectional shape or profile as in Figures 1-4.

Figures 10 and 11 are companion views showing a construction intended to be used in connection with the bearing member B² shown in Figures 10a and 11a, respectively. Referring to these views, it will be seen that the stirrup S carries a bearing member such as B or B', while the drawel channel D carries the bearing member B² which includes an elongated body having an open medial portion with the anchoring elements 13 offset from the rear face thereof while the body of the bearing member has its side portions inclined or chamfered as indicated at 14. The chamfered portion of the elongated body portion B² is intended to cooperate with a correspondingly grooved portion 15 in the upper flange 16 of the case channel C (Fig. 10) while the anchoring elements 13 are secured to the wall of the horizontal drawer channel D. The bearing member B³ of Figure 11a includes the same general feature of the bearing member B² of Figure 10a except that the chamfered portion 14ª which cooperates with the groove 15 is provided with horizontally disposed lateral extensions 14ᵇ. The bearing member B³ has the anchoring elements 13ᵇ projecting from the flat face of the chamfered portion 14ª so that they may be pressed over into engagement with corresponding openings in the bottom of the groove 15 of the flange 16 of the case channel C.

Companion Figures 12 and 13 are intended for use in connection with the bearing members shown in Figures 12a and 13a. Referring first to Figure 12, it will be seen that the underside of the drawer channel D provides a surface with which one edge of the bearing member B⁴ may bear. This bearing member B⁴ has the same general characteristics of the other bearing members described but, as will be seen from Figure 12a, the anchoring elements 17, while longitudinally aligned, are offset to one side of the longitudinal center of the rectangular body. Thus, the anchoring element 17 may be passed through suitable spaced openings in the upstanding flange 18 at the front of the case channel C in Figure 12 so that the edge 19 bears against the inner face of the inverted guide portion of the drawer channel D adjacent the vertical flange thereof. The rear portion of the drawer channel D, as shown in Figure 13, has secured thereto a bearing member B⁵ which is of oblong rectangular formation and is provided with the anchoring elements 20 which are inserted in openings in the horizontal flange of the drawer channel D located near the included angle between the horizontal flange and the short flange of the drawer channel D. As will also appear from Figure 13, the case channel C is provided at the upper portion of the flange 18 with a horizontal flange 21 which is depressed relative to the top of the vertical flange 18 so as to provide a shoulder 18ª at the junction of flanges 18 and 21 and which in connection with the short down-turned flange of the drawer channel D provide a relatively confined space in which the bearing member B⁵ is located. This arrangement will avoid any excessive lateral movement between the rear ends of the drawer channel and the case channel.

Figures 14 and 15, which are also companion views, illustrate an arrangement which utilizes the bearing members B⁶ and B⁷ shown in Figures 14a and 15a. It will be seen from these figures that the upper portion of the case channel C is of the same cross sectional shape at the front end (Fig. 14) as it is at the rear end as shown, for example, in Figure 13. That is to say, the case channel C includes throughout the vertical flange 18 and the horizontal flange 21 which is depressed relative to the upper edge of the vertical wall 18 to form the shoulder 18ª previously referred to. At the front end (Fig. 14) of the suspension, the drawer channel D is provided with the bearing member B⁶ which includes the anchoring elements 22 and the rectanguluar body 23 whose bottom edge portions are slightly chamfered as shown. This bearing member B⁶ is fitted in the included angle of the horizontal and short flanges of the drawer channel D and bears on the depressed horizontal flange 21.

From Figures 15 and 15a, it will be seen that the bearing member B⁷ includes a rectanguluar body portion 24 with one edge 25 thereof extending horizontally beyond the body in the plane of the bearing face 26, while the side of the body opposite the bearing face 26 is provided with the anchoring elements 27. As illustrated in Figure 15, the bearing member B⁷ is secured to the depressed flange 21 of the case channel C and the horizontal lateral extension 25 extends over the folded edge portion or shoulder 18ª between the vertical flange 18 and horizontal flange 21 so that the bearing face 26 provides an extended engagement with the underside of the inverted drawer channel D. Thus, the bearing members B⁷, because of their horizontal width, reduce side play at the rear of the suspension.

Figures 16 and 17 are intended for use in connection with the bearing members B⁸ and B⁹ shown in Figures 16a and 17a, respectively. Referring first to Figure 16, it will be seen that the case channel C is provided at its upper portion with the connected horizontal and vertical flange portions 28 and 29, the latter of which terminates in the horizontal flange 30 which carries the bearing member B⁸. This bearing member is provided with a traction surface 31 and the anchoring elements 32 on its opposite face, said anchoring elements being fitted into the horizontal flange 30 of the case channel C, while the bearing face 31 engages the underside of the horizontal flange of the inverted guide portion of the drawer channel D. The rear part of the case channel C, shown in Figure 17, includes in addition to the flange portions 28, 29 and 30, an upstanding flange 33 which lies opposite but is spaced from the down-turned short flange of the drawer channel D which carries the bearing member B⁹. This member is provided with a traction face 34 and the anchoring elements 35 extend from the opposite face thereof. The anchoring elements 35 are anchored in the drawer channel as indicated at 36 so that the traction face 34 of the bearing member B⁹ rests on the flange 30 of the case channel. It will also be seen from Figure 17 that the upper flange of the stirrup S is provided with a bearing member B⁹ with its traction face 34 facing upwardly to engage the underside of the horizontal flange portion 28 of the case channel C.

From the foregoing, it will be seen that all forms of the invention illustrated contemplate the use of a bearing block of substantially oblong rectangular formation, and the side opposite the traction or bearing face is provided with spaced aligned anchoring elements which prevent angular movement of the bearing block during the sliding movements of the respective parts of the drawer suspension. The anchoring elements may be aligned along the longitudinal axis of the elongated bearing member, or they may be still aligned but offset to one side of said axis, depending upon the location at which they are used.

Without further description, it is believed that the invention will be understood, and that changes may be resorted to within the scope of the appended claims.

We claim:

1. A bearing for drawer suspensions including mating fixed and sliding sections, at least one of which is provided with spaced parallel openings, a body of lubricous material of elongated block-like form having opposed parallel faces, one of said faces having a smooth uninterrupted bearing surface for friction reducing engagement with a related surface of a mating section, and a pair of spaced parallel anchoring elements rigid with said body and projecting from the other of said faces normal thereto receivable in said openings, the said anchoring elements being of greater length than said openings and the portions thereof which are extendable beyond the openings being deformable for securely holding the body against detachment from the section having the openings and for preventing rotation of the body about an axis parallel to the axes of the openings.

2. A bearing according to claim 1, wherein the body is provided with inclined side portions which converge toward its outer face.

3. A bearing according to claim 1, wherein the body is elongated and the projections are alined at one side of the longitudinal axis of the body.

4. A bearing according to claim 3, wherein the body is provided at its outer face with a laterally offset edge portion disposed at right angles to the projections.

5. A bearing according to claim 1 wherein the face from which said anchoring elements project is narrower than the other face with resulting lateral extensions on the body adjacent said other face.

References Cited in the file of this patent

UNITED STATES PATENTS

| | | |
|---|---|---|
| 2,514,664 | Miller | July 11, 1950 |
| 2,519,623 | Baker | Aug. 22, 1950 |
| 2,606,091 | Buchy et al. | Aug. 5, 1952 |